United States Patent [19]

Kirstein

[11] 4,397,205
[45] Aug. 9, 1983

[54] ALIGNING AND MEASURING DEVICE FOR ROLLED PLATE

[75] Inventor: Hartmut Kirstein, Solingen, Fed. Rep. of Germany

[73] Assignee: SMS Schloemann-Siemag Aktiengesellschaft, Dusseldorf, Fed. Rep. of Germany

[21] Appl. No.: 268,241

[22] Filed: May 29, 1981

[30] Foreign Application Priority Data

Jun. 11, 1980 [DE]  Fed. Rep. of Germany ....... 3021826

[51] Int. Cl.³ ............................................. B23D 36/00
[52] U.S. Cl. ....................................... 83/364; 83/367; 83/419; 83/421
[58] Field of Search ...................... 83/72, 74, 209, 251, 83/253, 364, 367, 421, 39, 419

[56] References Cited

U.S. PATENT DOCUMENTS

Re. 20,511  9/1937  Hudson ............................. 83/364 X
1,860,340  5/1932  Biggert, Jr. .......................... 83/421

Primary Examiner—James M. Meister
Attorney, Agent, or Firm—Holman & Stern

[57] ABSTRACT

For cutting metal plate with curved edges so that the transverse cuts are perpendicular to the chord of the curve, the leading plate end is laterally located against an abutment close to the cutter, and the plate is swivelled about the abutment until the plate edge at the position of the trailing end cut is in a position corresponding to the leading end at the abutment. The plate edge position is monitored by extensible feelers which also measure the curvature of the plate edge.

6 Claims, 3 Drawing Figures

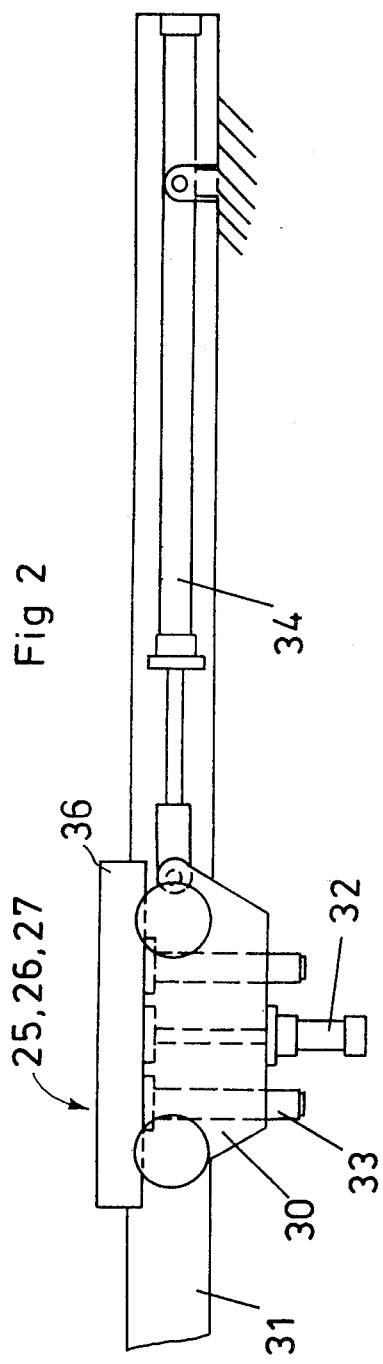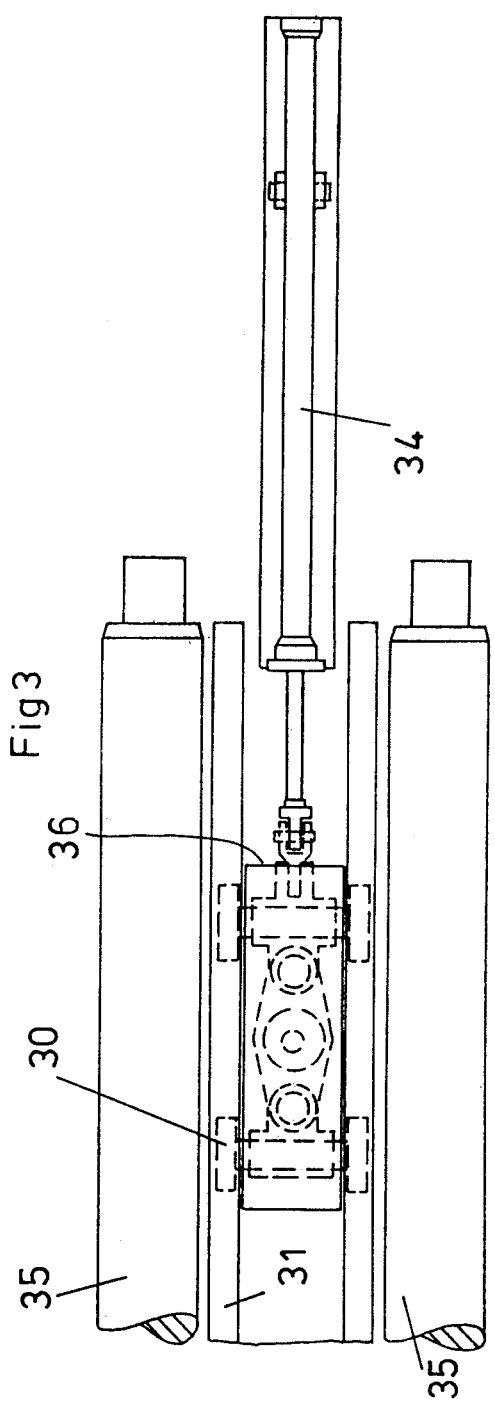

ALIGNING AND MEASURING DEVICE FOR ROLLED PLATE

BACKGROUND OF THE INVENTION

1. Field of the Invention

The invention relates to a device for aligning and measuring rolled plate with arcuate side edges extending in the same sense.

2. Description of the Prior Art

In heavy-plate dressing shops, some rolled plates have, after trimming, arcuate edge contours which extend in the same sense on both sides. The rolled plates are transferred on a roller table to a guillotine, shears, or like cutter and after being slid against a fixed stop fence they are cut into sections. It therefore follows, that the front and rear cross edges of the cut sections cannot extend perpendicularly to the chord of the edge arc. This defect cannot be remedied efficiently by planing of the side edges. As a result, in the manufacture of large-diameter pipes by longitudinal seam welding of heavy-plate sections, steps occur at the pipe ends in the weld regions, and these steps must be smoothed, with considerable effort.

A device is known for measuring and aligning sections of heavy plate on an edge planing machine, comprising a plurality of measuring and sliding hooks which are disposed on both sides of the plate so as to be movable transversely to said plate. This device is complex and unsuitable for aligning uncut rolled plate of long lengths.

BRIEF SUMMARY OF THE INVENTION

The object of the invention is to provide a simple device by means of which rolled plates disposed e.g. on a roller table upstream of a guillotine can be so aligned, that the cross cut edges extend perpendicularly to the chord of the edge arc of the individual sections. Another object is to provide means by which it is possible to determine the edge contours of the individual sections.

According to the invention, this is achieved by the provision of a lateral stop abutment which is situated directly in front of a cross cutter for rolled plate and is associated with a leading point P1 of one plate side edge, a plurality of measuring probes which are transversely extensible over a guillotine roller table and are disposed at a distance from each other on the abutment side, and a plurality of plate-aligning elements between the rollers of a feeder roller table, each such aligning element being adapted to traverse transversely across the roller table and each having a plate-entraining member which can be raised above the top of the roller table.

With the present device it is possible to align rolled plates in accordance with the next specified section length so that cross cuts are obtained which are perpendicular to the chord of the plate edge arc. In the manufacture of pipes it is therefore possible to avoid the finishing of the pipe end faces and machining allowances can be saved.

To permit alignment of each possible section length, the lateral abutment position can be reproduced by each of the measuring probes at will.

According to another feature of the invention the measuring probes are connected to means for recording, storing and delivering data. The edge contour of each part length can thus be transmitted to a subsequent edge machining device and the machining dimensions can be adjusted accordingly, thus obviating the need for renewed measuring operation on the longitudinal edge, and the cross cutting position therefore defines subsequent processing.

Pairs of live rollers are advantageously provided on each roller table side upstream and downstream of the guillotine. After plate alignment, the pairs of live rollers guide the plate is defined manner and hold it during the cutting operation.

In the operation of the device according to the invention a leading point P1 of one plate side edge is fixed by the lateral abutment, the aligning elements pivot the plate into a position in which a measuring probe, associated with a trailing point P2 of the said side edge, indicates a position which corresponds to the stop abutment position of the point P1, and the measuring probes disposed between the points P1 and P2 of the plate side edge measure the height of arc thereof and transmit this height to means for recording, storing and delivering data.

With the invention it is possible to accurately and rapidly align and measure the edge contour of the specified plate lengths prior to cutting, whereby in subsequent processing repetition of measurements is eliminated and the processing position remains constant throughout all stages.

BRIEF DESCRIPTION OF THE DRAWINGS

The invention will now be described in detail with reference to the accompanying drawings wherein;

FIGS. 2 and 3 are enlarged side and plan views, respectively, of a detail of FIG. 1.

DETAILED DESCRIPTION

Figure 1:
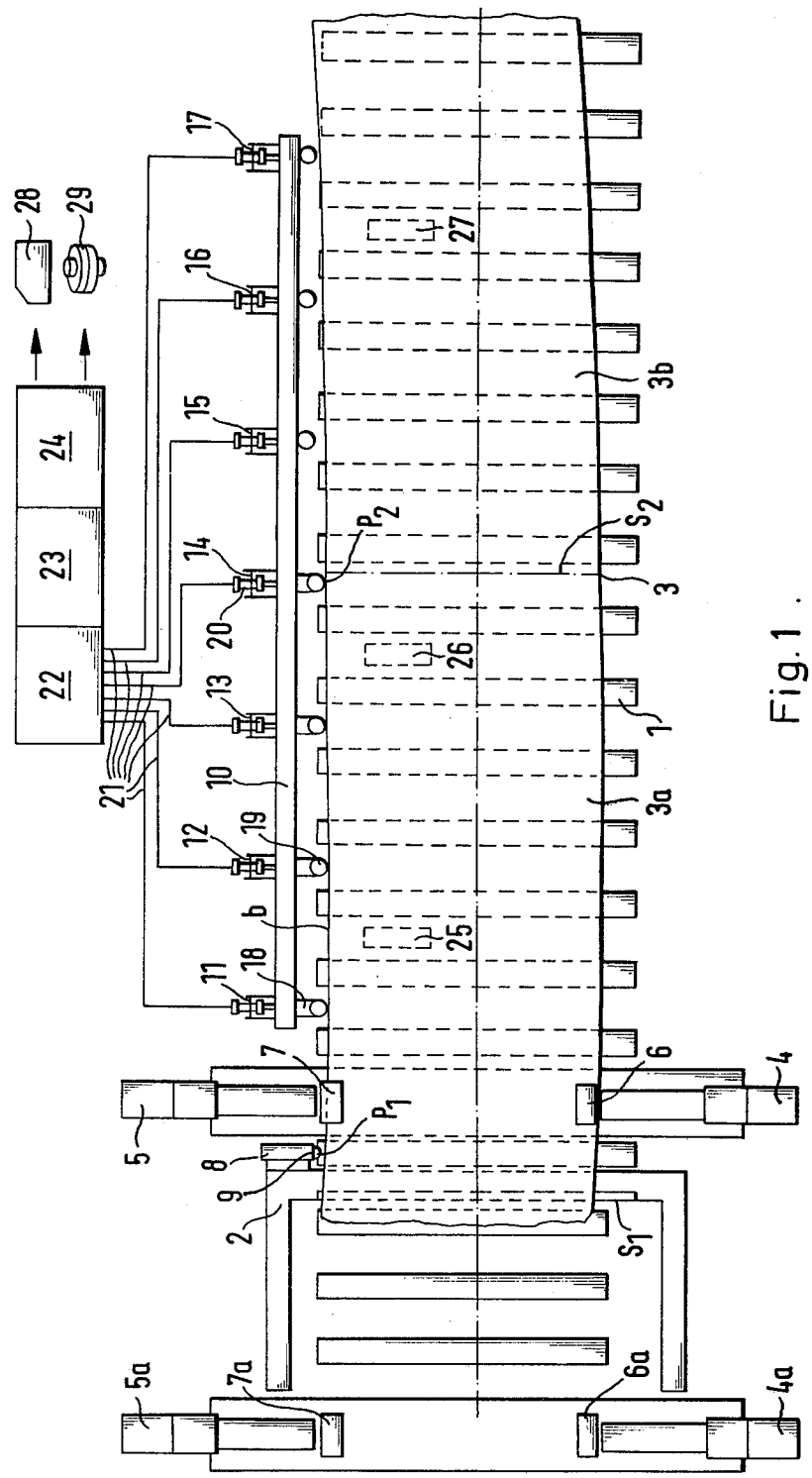
FIG. 1 is a plan view of the plate-shearing apparatus of the invention.

FIG. 1 shows a plan view of a roller table portion 1 with a guillotine 2 for subdividing rolled metal plates 3, which are conveyed on the roller table 1 and can have a varying arcuate edge contour. One pair of live rollers 6,7, driven by respective motors 4, 5, is disposed upstream of the guillotine 2 on each side of the roller table 1, and a second pair of live rollers 6a, 7a, driven by respective motors 4a, 5a, is disposed downstream of the guillotine 2 on each side of the roller table 1; one roller of each pair is adjustable transversely to the roller table 1.

A lateral abutment device 8, constructed as a cylinder with a piston rod which supports a stop abutment 9 in the exemplified embodiment, is mounted on the frame of the guillotine 2 on one side of the roller table 1. In its extended position the stop abutment 9 supports a leading point P1 on one arcuate side edge b of a rolled metal plate 3.

A plurality of measuring probes 11 to 17 are mounted, spaced from each other, on a longitudinal girder 10, which is anchored adjacent to the roller table 1 upstream of the driver rollers, in order to measure the plate side edge b. Each measuring probe is provided with a feeler element 18 which can be extended in the direction of the plate side edge b and carries a roller 19. Each measuring probe is also associated with a transducer 20, which transmits the measuring signals via conductors 21 to a data recorder 22, a data store 23 and a data delivery apparatus 24.

Plate-aligning elements 25, 26, 27, which are each equipped with a vertically adjustable magnet plate and can traverse parallel to the roller axes, are disposed between pairs of the roller table rollers.

To perform a cropping or dividing cut, the roller plate 3 is moved by the roller table 1 so that the intended cutting line S1 is brought to the cutting line of the guillotine 2. Thereafter, the stop abutment 9 is moved into its fixed position. In this position, the leading point P1 of the plate side edge b is fixed in the lateral direction by the extended s ɔp abutment 9. Thereafter the feeler elements 18 of the measuring probles 11 to 14, in the region extending as far as the intended second cut S2, are pushed with their rollers 19 against the plate side edge b of the first plate portion 3a. The number of feeler rollers employed therefore depends on the intended length of the portions 3a or 3b.

The data obtained by the measuring probes 11 to 14 are via recorder 22, data store 23 and data delivery 24 units indicated to the guillotine operator. By raising the magnet plates and by sliding the aligning elements 25, 26, 27 transversely, the operator pivots the plate 3 about the point P1 into a position in which a trailing point P2 on the side edge b monitored by the nearest measuring probe 14, has reached a position which is identical with that of the point P1 with respect to the roller table axis and the guillotine. The first portion 3a of plate 3 is thus in optimum alignment with the guillotine. The plate is then clamped by the drivers 6,7 and the aligned position is thus fixed. The cropping cut is made in this position, and the measuring data obtained by the measuring probes 11–14 to determine the edge contour of the portion 3a are transmitted to the data recorder 22, the data store 23 and the data delivery means 24. The data are transferred for documentation purposes by the data delivery means to a punched card 28 or to a magnetic plate or disc 29 fo further processing. Thereafter, the rolled plate is moved by the drivers to move the line S2 onto the cutting line of the guillotine 2 without altering the aligned position, and the parting cut is made.

The second portion 3b is aligned, measured and cropped or cut off from succeeding portions in like manner. The drivers 6a, 7a guide the plate without altering the aligned position.

FIGS. 2 and 3 illustrate the plate-aligning elements 25, 26, 27, each disposed between two rollers 35 of the roller table. Each such element comprises a magnet plate 36 mounted by vertical guide pins 33 for vertical movement on a wheeled carriage 30. The carriage 30 is movable along tracks 31 between and parallel to the rollers 35. A vertical fluid-pressure cylinder 32 is mounted on the underside of the carriage for lifting and lowering the plate 36. A horizontal cylinder 34 is mounted between the tracks 31 for moving the carriage 30.

The magnet plates 36 can be replaced by other entraining members for shifting the plates to be cut; the entraining members are preferably plate-like, e.g. suction plates.

I claim:

1. In apparatus for transversely cutting rolled metal plate comprising cutting means and plate support and conveying means defining a plate path to and through said cutting means, the improvement comprising, for aligning plates with arcuate side edges:
   a lateral abutment adjacent to the cutting means on the upstream side of the latter relative to the said plate path, which abutment is disposed at one side of said plate path and is adapted to abut on and locate in a predetermined lateral position a selected side edge of a said plate,
   a plurality of measuring sensors on the upstream side of the cutting means, disposed adjacent to the said path at the same side thereof as the said abutment, spaced apart along the said path and each adapted to sense the position of the selected side edge of the plate, and a plurality of aligning elements disposed upstream of the cutting means for laterally adjusting the position of the said plate, each said aligning element comprising a plate entraining member mounted for vertical movement into and out of engagement with said plate and for movement transversely to the said plate path.

2. Apparatus as claimed in claim 1 wherein each measuring sensor is adapted selectively to reproduce the position of the lateral abutment.

3. Apparatus as claimed in claim 1 or 2 and further comprising a data recorder, a data store, and data delivery means, connected to the measuring sensors.

4. Apparatus as claimed in claim 1 or 2 and further comprising pairs of plate-driving rollers disposed upstream and downstream of the cutting means on both sides of the said plate path.

5. Apparatus as claimed in claim 1 or 2 wherein the plate support and conveying means comprise a roller table, and each said aligning element is disposed between successive rollers of the roller table.

6. A device for aligning and measuring rolled plate with arcuate side edges extending in the same sense and supported on a feed roller table, comprising a plurality of extensible measuring probes at one side of the plate support, a cross shifting device, a lateral stop abutment situated directly in front of a guillotine for the rolled plate and associated with a leading point of one plate side edge, said plurality of measuring probes being transversely extensible over the roller table and in spaced relationship with respect to each other on the stop abutment side of the guillotine, and a plurality of aligning elements between the rollers of the feeder roller table, each such aligning element being adapted to traverse transversely across the roller table and each having a plate entraining member which can be raised above the top of the roller table.

* * * * *